United States Patent
Bae et al.

(10) Patent No.: US 11,240,368 B2
(45) Date of Patent: Feb. 1, 2022

(54) MESSAGE PROCESSING METHOD AND ELECTRONIC DEVICE IMPLEMENTING SAME

(71) Applicant: Samsung Electronics Co., Ltd., Gyeonggi-do (KR)

(72) Inventors: Jongkyu Bae, Seoul (KR); Jina Yoon, Gyeonggi-do (KR); Haeseong Kim, Gyeonggi-do (KR); Hyerim Kim, Gyeonggi-do (KR); Chankee Lee, Seoul (KR); Kiyoung Lim, Gyeonggi-do (KR); Han-Seong Jung, Gyeonggi-do (KR); Changhyup Jwa, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/464,415

(22) PCT Filed: Nov. 27, 2017

(86) PCT No.: PCT/KR2017/013607
§ 371 (c)(1),
(2) Date: May 28, 2019

(87) PCT Pub. No.: WO2018/101688
PCT Pub. Date: Jun. 7, 2018

(65) Prior Publication Data
US 2020/0344348 A1    Oct. 29, 2020

(30) Foreign Application Priority Data
Nov. 29, 2016  (KR) .................. 10-2016-0160342

(51) Int. Cl.
*H04M 1/7243* (2021.01)
*H04L 12/58* (2006.01)
(Continued)

(52) U.S. Cl.
CPC .......... *H04M 1/7243* (2021.01); *H04L 51/38* (2013.01); *H04L 67/06* (2013.01); *H04L 67/26* (2013.01);
(Continued)

(58) Field of Classification Search
CPC .............. H04M 1/72547; H04M 3/42; H04M 2201/38; H04L 51/38; H04L 67/06; H04L 67/26; H04W 4/12
See application file for complete search history.

(56) References Cited

U.S. PATENT DOCUMENTS

2003/0188316 A1* 10/2003 DePrez .................. G06Q 20/40
725/87
2006/0161853 A1* 7/2006 Chen ...................... G06Q 10/10
715/758
(Continued)

FOREIGN PATENT DOCUMENTS

EP            2224652 B1   12/2008
KR    10-2011-0132154 A   12/2011
(Continued)

*Primary Examiner* — Ernest G Tacsik
(74) *Attorney, Agent, or Firm* — Cha & Reiter, LLC

(57) ABSTRACT

Various embodiments provide an electronic device and a method, the electronic device comprising a memory, a communication module, a display, and a processor functionally connected to the memory, the communication module, or the display, wherein the processor is set to determine whether a message received through the communication module includes a message display time and to determine whether to display the message by requesting a message service server to check whether to display the received message when a current time approaches the message display time. In addition, other embodiments are also possible.

10 Claims, 13 Drawing Sheets

(51) Int. Cl.
*H04L 29/08* (2006.01)
*H04M 3/42* (2006.01)
*H04W 4/12* (2009.01)

(52) U.S. Cl.
CPC ............... *H04M 3/42* (2013.01); *H04W 4/12* (2013.01); *H04M 2201/38* (2013.01)

(56) References Cited

U.S. PATENT DOCUMENTS

| | | | |
|---|---|---|---|
| 2007/0211630 A1* | 9/2007 | Seo | H04L 51/12 370/230 |
| 2009/0298472 A1* | 12/2009 | Nagano | H04L 12/1859 455/412.1 |
| 2010/0273456 A1* | 10/2010 | Wolovitz | G06Q 10/109 455/412.2 |
| 2011/0035591 A1* | 2/2011 | Dudziak | H04W 12/0013 713/168 |
| 2014/0279846 A1* | 9/2014 | Srinivasan | G06F 16/93 707/608 |
| 2015/0207893 A1 | 7/2015 | Lee | |
| 2015/0236990 A1* | 8/2015 | Shan | H04L 51/046 709/206 |
| 2016/0014057 A1 | 1/2016 | Gudla et al. | |
| 2016/0164808 A1* | 6/2016 | Lin | H04L 51/38 709/206 |
| 2017/0054670 A1* | 2/2017 | Lee | H04L 51/24 |

FOREIGN PATENT DOCUMENTS

| | | |
|---|---|---|
| KR | 10-2014-0029306 A | 3/2014 |
| KR | 10-2015-0031170 A | 3/2015 |
| KR | 10-2016-0033801 A | 3/2016 |
| KR | 10-2016-0081536 A | 7/2016 |

\* cited by examiner

MESSAGE PROCESSING METHOD AND ELECTRONIC DEVICE IMPLEMENTING SAME

CLAIM OF PRIORITY

This application is a National Phase Entry of PCT International Application No. PCT/KR2017/013607, which was filed on Nov. 27, 2017 and claims a priority to Korean Patent Application No. 10-2016-0160342, which was filed on Nov. 29, 2016, the contents of which are incorporated herein by reference.

TECHNICAL FIELD

The disclosure relates to a method and an apparatus for processing a message.

BACKGROUND ART

With the recent development of digital technologies, various types of electronic devices such as mobile communication terminals, Personal Digital Assistants (PDAs), electronic organizers, smart phones, tablet Personal Computers (PCs), and wearable devices have been widely used. Such electronic devices have continuously improved hardware parts and/or software parts thereof in order to support and increase functions.

Generally, electronic devices provide various message transmission means such as Short Message Service (SMS), multimedia Message Service (MMS), or instant messenger service. Another type of the message may be a push message. The push message is used for simultaneously transmitting a large quantity of the same message to a plurality of users for marketing, notification, and welcome messages, for example.

DISCLOSURE OF INVENTION

Technical Problem

For the reason described above, a push message has been transmitted in large quantities, but the push message is handled similar to SMS and thus does not have a function of enabling cancelling or withdrawing an already transmitted message.

Various embodiments may provide a method and an apparatus for canceling a message already transmitted by a server.

Solution to Problem

In accordance with an aspect of the disclosure, an electronic device includes: a memory; a communication module; a display; and a processor functionally connected to the memory, the communication module, or the display, wherein the processor is configured to determine whether a message received through the communication module contains a message display time and, when a current time approaches the message display time, make a request for identifying whether to display the received message to a message service server to determine whether to display the message.

In accordance with another aspect of the disclosure, an electronic device includes: a storage unit; a communication unit; and a controller functionally connected to the storage unit or the communication unit, wherein the controller is configured to generate a message containing a message display time, transmit the generated message to an external electronic device through a communication module, determine whether to cancel the transmitted message and, when a request for identifying whether to display the message is received from the external electronic device, transmit a display control command on the external electronic device.

In accordance with another aspect of the disclosure, a method of operating an electronic device includes an operation of determining whether a received message contains a message display time, an operation of, when the received message contains the message display time, determining whether a current time approaches the message display time, an operation of, when the current time approaches the message display time, making a request for identifying whether to display the received message to a message service server, and an operation of determining whether to display the message on the basis of a display control command received from the message service server by the request.

Advantageous Effects of Invention

According to various embodiments, when a server desires to cancel an already transmitted message, an electronic device can delete the cancelled message.

According to various embodiments, it is possible to reduce unnecessary acknowledgement of a cancelled message by checking whether the message is cancelled before the message is displayed.

According to various embodiments, an electronic device can delete a cancelled message before a message display time by configuring the message display time when transmitting the message.

According to various embodiments, when it is desired to cancel a message transmitted to an electronic device, it is possible to delete the message before the message is displayed to a wrong user who received the message by deleting content related to the message.

BEST MODE FOR CARRYING OUT THE INVENTION

Figure 1:
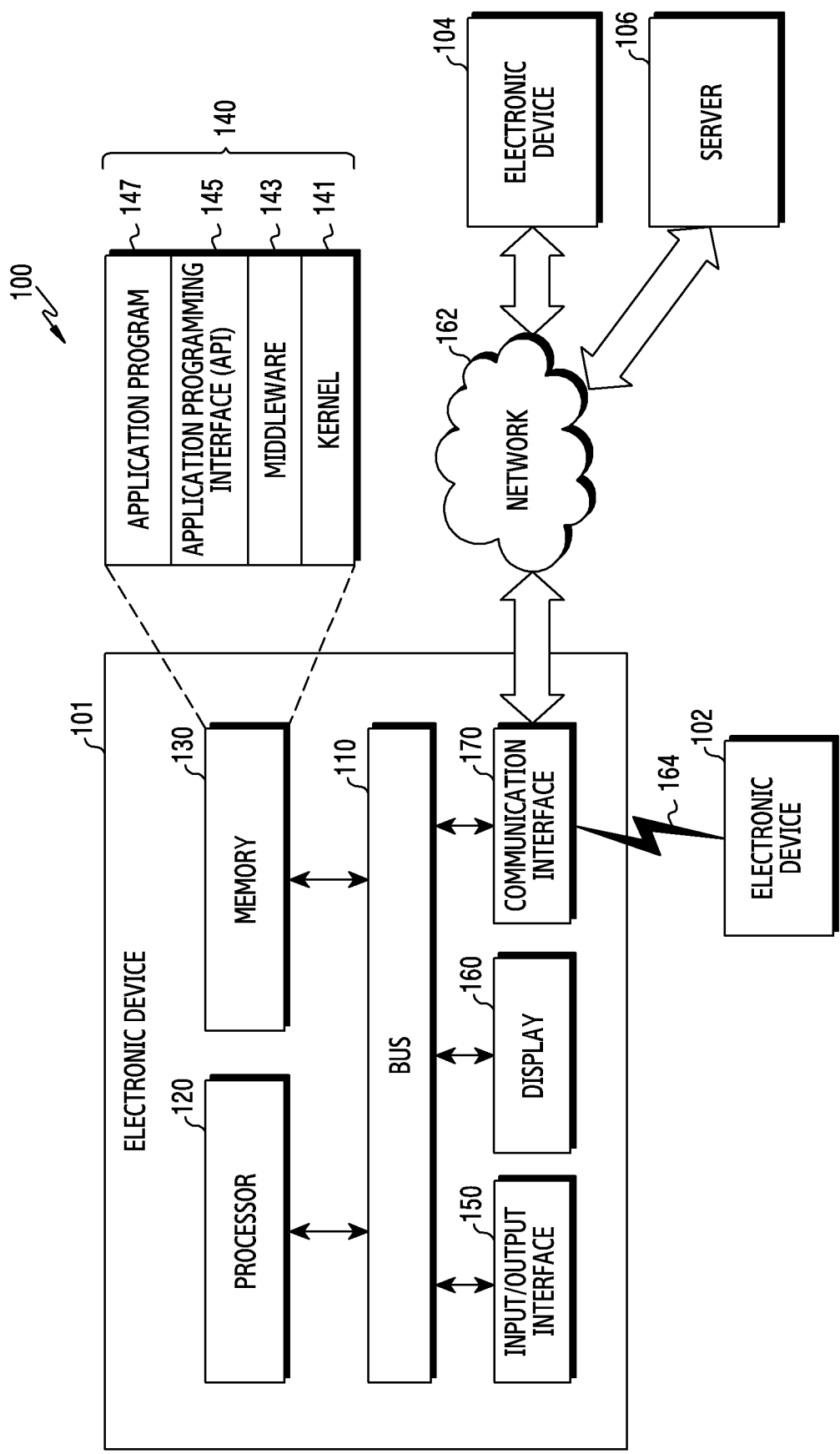
FIG. 1 illustrates an electronic device within a network environment according to various embodiments.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements. A singular expression may contain multiple expressions unless the context explicitly implies otherwise. In the present disclosure, the expression "A or B", "at least one of A or/and B", or "one or more of A or/and B" may include all possible combinations of the items listed. The expression "a first", "a second", "the first", or "the second" used in various embodiments of the present disclosure may modify various components regardless of the order and/or the importance but does not limit the corresponding components. It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them.

The expression "configured to" used in the present disclosure may be used interchangeably with, for example, "suitable for", "having the capacity to", "designed to", "adapted to", "made to", or "capable of" hardware or software according to the situation. Alternatively, in some situations, the expression "device configured to" may refer to a situation in which that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. The wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, a drone, an automatic teller's machine (ATM) in banks, point of sales (POS) in a shop, or internet device of things (e.g., a light bulb, various sensors, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture, a building/structure or a vehicle, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to an example embodiment of the present disclosure is not limited to the aforementioned devices. In this document, the term "user" may indicate a person using an electronic device or a device (for example, an artificial intelligence electronic device) using an electronic device.

FIG. 1 is a diagram illustrating an electronic device 101 within a network environment 100, according to various embodiments.

According to the FIG. 1, the electronic device 101 may include a bus 110, a processor 120, a memory 130, an input/output interface 150, a display 160, and a communication interface 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147 and may perform the one or more task requests. The API 145 is an interface through which the applications 147 control functions provided from the kernel 141 or the middleware 143, and may include, for example, at least one interface or function (e.g., instruction) for file control, window control, image processing, character control, and the like. The input/output interface 150, for example, may transfer commands or data input from a user or another external device to the other element(s) of the electronic device 101, or may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may include cellular communication using at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. According to an one embodiment, the wireless communication may include at least one of, for example, Wi-Fi, Bluetooth, Bluetooth low energy (BLE), Near Field Communication (NFC), magnetic secure transmission, radio frequency (RF) or body area network (BAN).

According to an one embodiment, the wireless communication may include GNSS. The GNSS may be, for example, at least one of global positioning system (GPS), global navigation satellite system (Glonass), Beidou Navigation satellite system (Beidou) or Galileo, and the European global satellite-based navigation system. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a powerline communication, and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
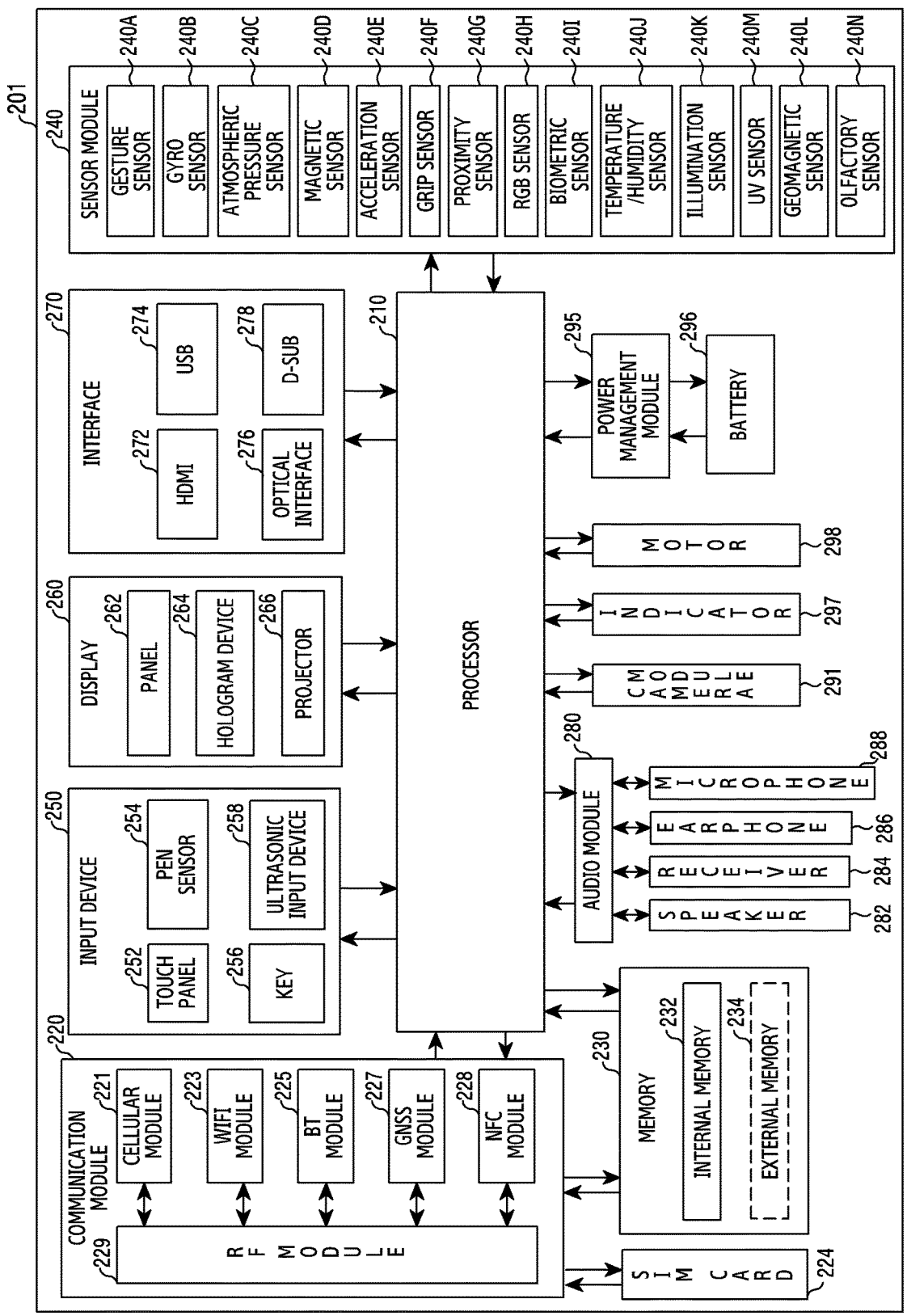
FIG. 2 is a block diagram illustrating the configuration of the electronic device according to various embodiments.

FIG. 2 is a block diagram illustrating an example electronic device 201 according to various example embodiments of the present disclosure.

According to the FIG. 2, the electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store result data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227, an NFC module 228, and a Radio Frequency (RF) module 229. The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, a projector 266 and/or a control circuitry to control thereof. The panel 262 may be implemented to be, for example, flexible, transparent, or wearable. The panel 262 may be configured with the touch panel 252 and one or more modules. According to an embodiment of the disclosure, the panel 262 may include a pressure sensor (or a force sensor) configured to estimate strength of a pressure on a touch of the user. The panel 262 may be embodied as a single module with the touch panel 252 or be embodied as one or more sensors distinct from the touch panel 252. The hologram device 264 may show a three dimensional (3D) image in the air by using an interference of light. The projector 266 may project light onto a screen to display an image. The screen may be located, for example, in the interior of or on the exterior of the electronic device 201. The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. The electronic device 201 may include a processing device (e.g., a GPU) for supporting a mobile TV to process media data according to a certain standard such as Digital Multimedia Broadcasting (DMB), Digital Video Broadcasting (DVB), or mediaFLO™. Each of the above-described component elements of hardware according to the present disclosure may be configured with one or more components, and the names of the corresponding component elements may vary based on the type of electronic device. In various embodiments, some of the above-described elements may be omitted from the electronic device (e.g., the electronic device 201), or the electronic device may further include additional elements. Also, some of the hardware components according to various embodiments may be combined into one entity, which may perform functions identical to those of the relevant components before the combination.

Figure 3:
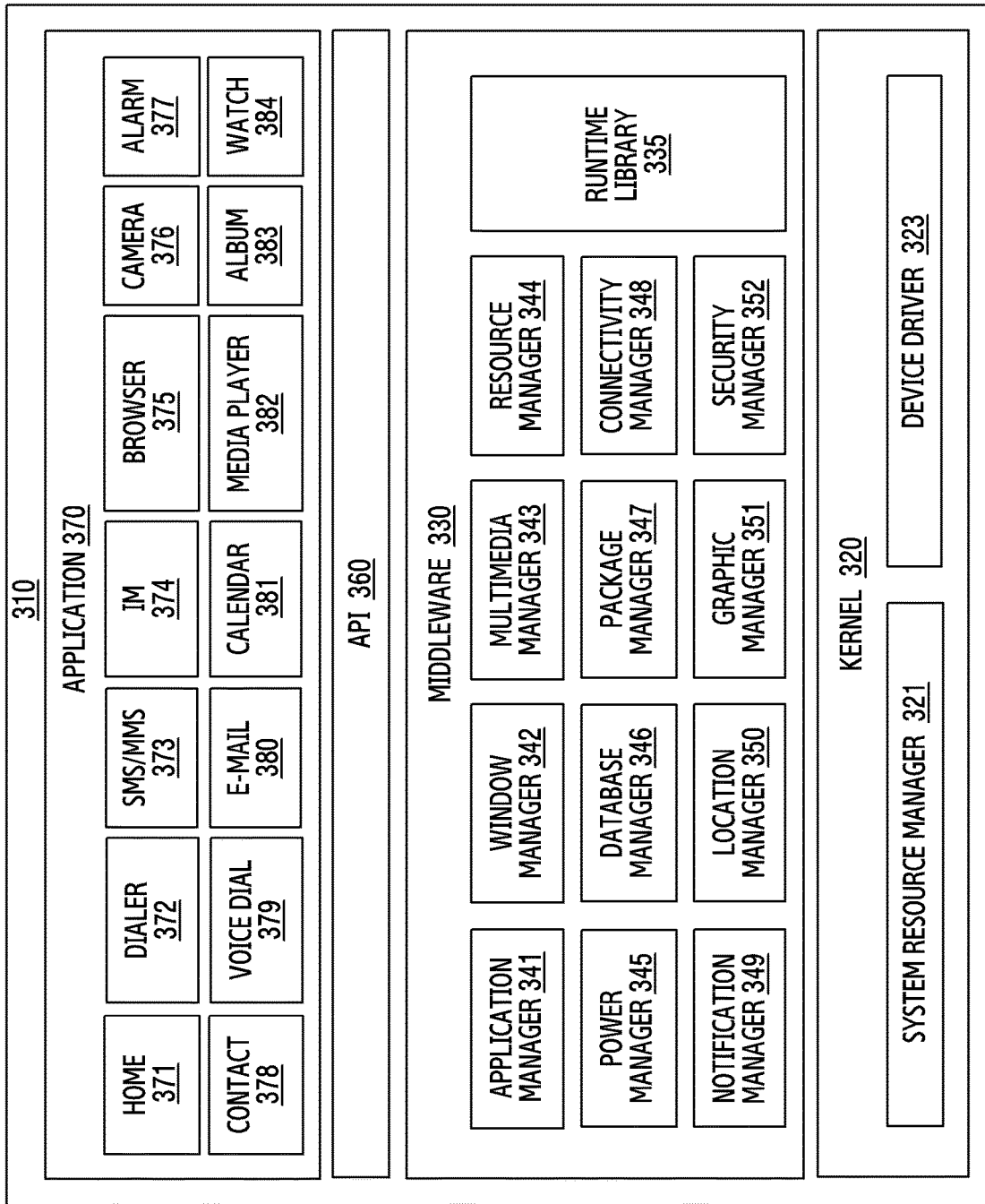
FIG. 3 is a block diagram illustrating a program module according to various embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like. According to FIG. 3, the program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like. The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format.

The resource manager 344 may manage resources of a source code, a memory, and a storage space of the applications 370. The power manager 345 may manage a capacity or power of the battery, and may provide power information required to operate the electronic device. According to an embodiment of the disclosure, the power manager 345 may operate together with, for example, a Basic Input/Output System (BIOS). The database manager 346 may generate, search for, and/or change a database to be used by the applications 370. The package manager 347 may manage installation or an update of an application distributed in a form of a package file.

For example, the connectivity manager 348 may manage wireless connectivity. The notification manager 349 may display or notify of an event such as an arrival message, promise, proximity notification, and the like to a user. The location manager 350 may manage, for example, location information of an electronic device. The graphic manager 351 may manage, for example, a graphic effect which will be provided to a user, or a user interface related to the graphic effect. The security manager 352 may provide all security functions required for, for example, system security, user authentication, or the like.

According to an embodiment of the present disclosure, the middleware 330 may further include a telephony manager for managing a voice call function or a video call function of the electronic device or a middleware module that forms a combination of various functions of the above-described components. The middleware 330 may provide a module specialized for each type of OS. Further, the middleware 330 may dynamically remove some of the existing components or add new components. The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 may include, for example, applications such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch 384, a health care (e.g., for measuring exercise quantity or blood sugar, etc.), or environment information (e.g., providing atmospheric pressure, humidity, or temperature information). According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may deliver, to the external electronic device, notification information generated by other applications of the electronic device 101 or may receive, from the external electronic device, the notification information and display the received notification information. The device management application may install, delete, or update, for example, at least one function of an external electronic device that communicates with the electronic device (for example, a function of turning on/off the external electronic device itself (or some components thereof) or a function of adjusting the brightness (or resolution) of a display), applications that operate in the external electronic device. According to an embodiment, the applications 370 may include applications (for example, a health care application of a mobile medical appliance, and the like) designated according to the attributes of an external electronic device (for example, the electronic device 102 or 104). According to an embodiment, the applications 370 may include applications received from an external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module" as used herein may, for example, mean a unit including one of hardware, software, and firmware, and may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction.

Figure 4A:
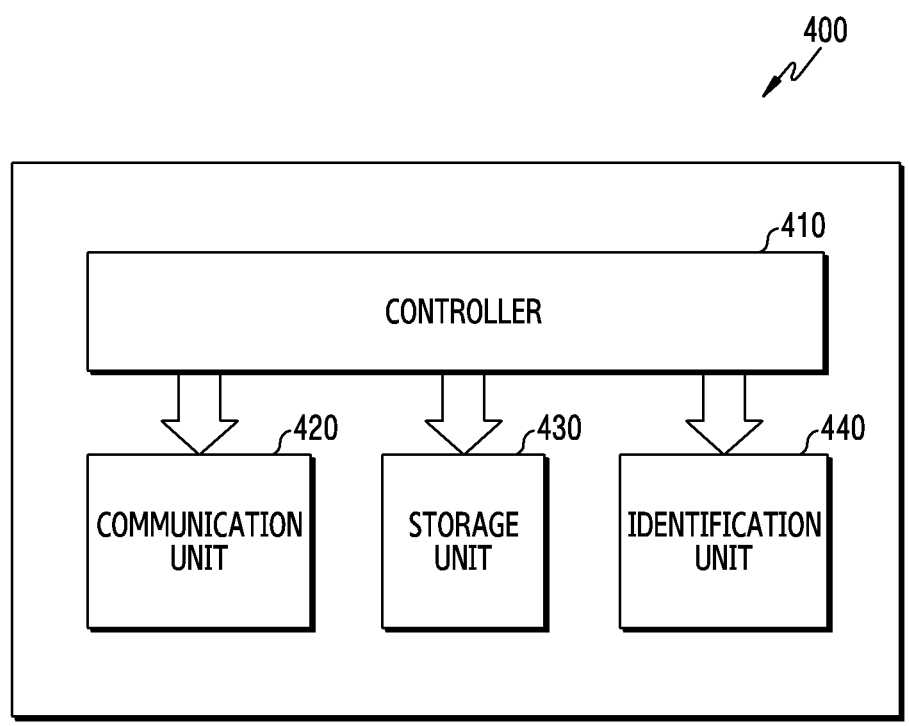
FIG. 4A is a block diagram illustrating the configuration of a message service server according to various embodiments.

FIG. 4A is a block diagram illustrating the configuration of a message service server according to various embodiments.

Referring to FIG. 4A, a message service server 400 may include a controller 410, a communication unit 420, a storage unit 430, and an identification unit 440.

The controller 410 may generate and manage a message (for example, an advertisement message or a marketing message). The message may include at least one of a short message service (SMS), a multimedia message service (MMS), an instant messenger service, or a push message. For example, the controller 410 may include a frontend system in the form of a website and a backend system for processing actual logic. The controller 410 may determine at least one of message text, a time at which a message is displayed, and a target to receive a message (for example, a receiver). The controller 410 may transfer a message containing the time at which the message is displayed and user information (for example, a phone number of the electronic device) corresponding to the target to receive the message to the communication unit 420.

When the message text contains content, the controller 410 according to various embodiments may store the content in the storage unit 430. The controller 410 may generate the message containing content information indicating the location at which the content is stored in the message. Further, the controller 410 may determine whether to cancel the transmitted message. The message may be used for marketing, notification, or welcome messages when the same text is transmitted at once in large quantities to a plurality of users. However, the message may contain peculiar content or the message may be transmitted to a wrong receiver like in the case in which the target to receive the message is incorrectly configured. Alternatively, there may be a request for canceling the message from a message transmission requester (for example, an advertiser). When it is determined to cancel an already transmitted message, the controller 410 may transmit a message cancellation command to an electronic device (for example, the electronic device 201) which makes a request for displaying the transmitted message or delete content related to the transmitted message from the storage unit 430.

The communication unit 420 may serve to transmit a message. For example, the communication unit 420 may transmit a message to the electronic device (for example, the electronic device 201) corresponding to user information according to a control of the controller 410. The communication unit 420 may transmit a message to each electronic device through a message transmission system. For example, the message transmission system may be Google Cloud Messaging (GCM), Apple Push Notification Service, (APNS), or Serial Port Profile (SPP). The communication unit 420 according to various embodiments may separately include a module (for example, cellular communication) for transmitting an SMS and a module (for example, Internet communication or data communication) for transmitting a push message.

The storage unit 430 may serve to store content related to a message. The content may include data (multimedia data) containing at least one of text, images, or videos. For example, a large image or video may have difficulty in transmission while being inserted into a message. The content stored in the storage unit 430 may be downloaded to the electronic device 201 at the message display time or when there is a user request. The storage unit 430 may store content for each content identifier. The storage unit 430 according to various embodiments may store information on whether to cancel a transmitted message. For example, the storage unit 430 may store cancellation information for each message identifier.

The identification unit 440 may serve to identify whether to display a message from the electronic device (for example, the electronic device 201) receiving the message. Whether to display the message may mean whether to display the message before the message transmitted to the electronic device 201 is displayed. The message transmitted to the electronic device 201 may be immediately displayed or displayed at the message display time (for example, a reservation time). The identification unit 440 may identify cancellation information corresponding to a message identifier of the message transmitted from the storage unit 430. When it is determined to cancel the transmitted message, the identification unit 440 may transmit a message cancellation command in response to the request for identifying whether to display the message. Alternatively, when it is determined not to cancel the transmitted message, the identification unit 440 may transmit a message display command in response to the request for identifying whether to display the message. The identification unit 440 according to various embodiments may include the controller 410.

Figure 4B:
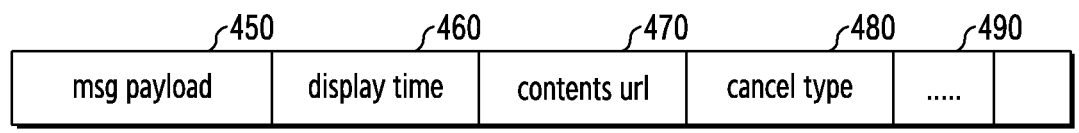
FIG. 4B illustrates an example of a message format according to various embodiments.

FIG. 4B illustrates an example of a message format according to various embodiments.

Referring to FIG. 4B, the controller 410 may generate a message containing a message pay load 450 (msg payload), a display time 460, a content information 470 (contents url), a cancellation type 480 (cancel type), and additional information 490. The message payload 450 may include a message identifier and message text. The message identifier may include a unique value for identifying a message. The message text may include at least one of text, an image, or a video. The display time 460 may indicate a time at which the message is displayed on the electronic device (for example, the electronic device 201) when the message is transmitted to the electronic device 201. For example, the display time 460 may be included in the case in which the transmitted message is a reserved message. Alternatively, the display time 460 may not be included in the case in which the message is immediately displayed after being transmitted to the electronic device 201. Alternatively, the message transmission time and the display time 460 may be the same.

When not all the data (for example, content) are contained in the message payload 450, the content information 470 may contain address information from which the content can be downloaded or location information in which the content is stored. For example, the content information 470 may be a Uniform Resource Location (URL) including a content identifier. The cancellation type 480 may include information on a message cancellation type. In the case of a message immediately displayed after message reception, the cancellation type 480 may include nothing. Alternatively, when the display time 460 arrives, the cancellation type 480 may indicate determination of whether to cancel the message before the display time 460. Alternatively, when the message contains the content information 470, the cancellation type 480 may indicate determination of whether to cancel the message when the content is downloaded. The controller 410 may generate the message including various pieces of information or data related to the message in the additional information 490.

An electronic device according to various embodiments includes: a memory; a communication module; a display; and a processor functionally connected to the memory, the communication module, or the display, wherein the processor is configured to determine whether a message received through the communication module contains a message display time and, when a current time approaches the message display time, make a request for identifying whether to display the received message to a message service server to determine whether to display the message.

When the received message contains the message display time, the processor may be configured to wait for displaying of the received message until the message display time.

When the received message contains the message display time, the processor may be configured to store the message in the memory without displaying the message on the display.

The processor may be configured to delete the message stored in the memory when a message cancellation command is received from the message service server by the request for identifying whether to display the message.

The processor may be configured to display the message stored in the memory on the display at the message display time when a message display command is received from the message service server by the request for identifying whether to display the message.

When a cancellation command is received from the message service server before the current time approaches the message display time, the processor may be configured to delete the message stored in the memory.

When the message contains content information, the processor may be configured to inform of reception of the message and, when a user input for a content download request from a user is detected through the message, transmit the content download request to the message service server.

When content is received from the message service server by the content download request, the processor may be configured to display the received content on the display and, when a content download-impossible command is received from the message service server by the content download request, display an error message on the display.

When the message contains the message display time and content information and the current time approaches the message display time, the processor may be configured to transmit a content download request to the message service server.

When the message contains the message display time and the content information, the processor may be configured to store the received message in the memory and wait for displaying of the received message until the message display time.

An electronic device according to various embodiments includes: a storage unit; a communication unit; and a controller functionally connected to the storage unit or the communication unit, wherein the controller is configured to generate a message containing a message display time, transmit the generated message to an external electronic device through a communication module, determine whether to cancel the transmitted message and, when a request for identifying whether to display the message is received from the external electronic device, transmit a display control command on the external electronic device.

The controller may be configured to transmit a message cancellation command or a message display command to the external electronic device on the basis of whether the transmitted message is cancelled.

When the message further contains content information, the controller may be configured to store content corresponding to the content information in the storage unit and delete the content stored in the storage unit on the basis of whether to cancel the transmitted message.

Figure 5:
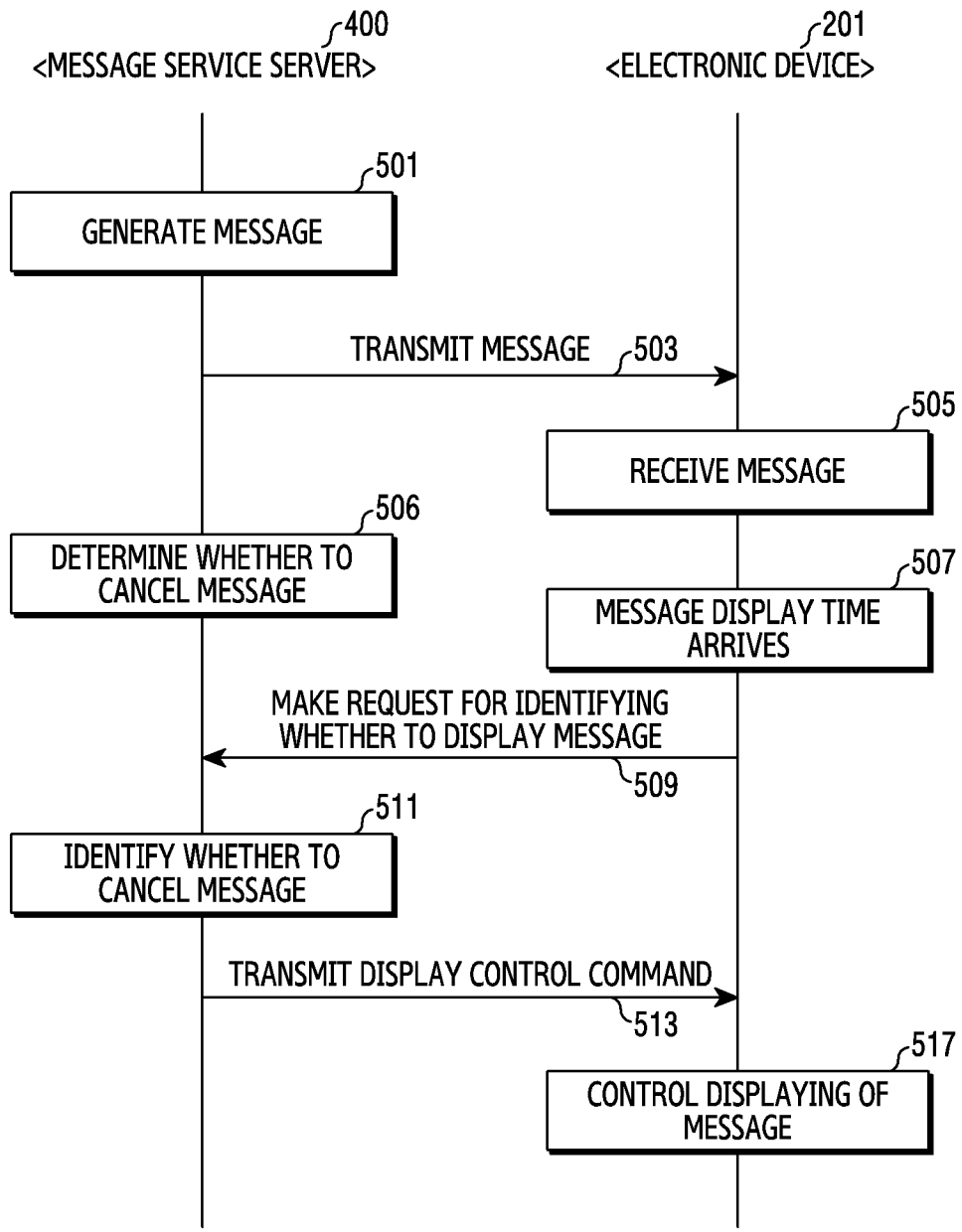
FIG. 5 is a flowchart illustrating a method of processing a message between a message service server and an electronic device according to various embodiments.

FIG. 5 is a flowchart illustrating a method of processing a message between a message service server and an electronic device according to various embodiments. For example, the flowchart in FIG. 5 illustrates an embodiment of processing cancellation of a message by inserting a display time into the message.

Referring to FIG. 5, in operation 501, the message service server (for example, the controller 410) may generate a message (for example, an advertisement message or a marketing message). The message may be at least one of the SMS, MMS, IMS, or push message. The message described below may be described on the basis of a push message by way of an example. For example, the controller 410 may generate a message containing message text (for example, the message payload 450) and a message display time (for example, the display time 460). Further, the controller 410 may determine a target to receive a message. The number of targets to receive the message may be singular or plural. In general, advertisement messages are transmitted in large quantities, so that the number of targets to receive the messages may be plural.

In operation 503, the message service server 400 (for example, the controller 410) may transmit the generated message. The controller 410 may transmit the message to the target to receive the message through the communication unit 420. At this time, the communication unit 420 may transmit the message to each electronic device corresponding to the target to receive the message through a message transmission system (for example, GCM, APNS, or SPP). After transmitting the message, the controller 410 may store a message identifier related to the message or the target to receive the message in the storage unit 430.

Hereinafter, it is described that the electronic device which receives the message is only one electronic device 201, but it is only for understanding of the disclosure and does not limit embodiments of the disclosure.

In operation 505, the electronic device 201 (for example, the processor 210) may receive the message. The processor 210 may receive the message from the message service server 400 through the communication module 220. The processor 210 may identify whether the received message contains a message display time (for example, a reserved display time). When the message contains the message display time, the processor 210 may store the received message in a buffer (for example, the memory 230) and waits until the message display time. Alternatively, when the message does not contain the message display time, the processor 210 may inform of the message reception immediately after the message is received. For example, the processor 210 may notify of the message reception through the display 260. In this case, the user may recognize the message reception through a notification of the message reception displayed on the display 260.

In operation 506, the message service server 400 (for example, the controller 410) may determine whether to cancel the message. After transmitting the message to the electronic device 201, the controller 410 may determine whether to cancel the transmitted message. For example, when the message contains peculiar content, when a target to receive the message is incorrectly configured, or when there is a request from a message sender, the controller 410 may determine to cancel the transmitted message. That is, operation 506 may be performed anytime after operation 503. For example, operation 506 may be performed between operation 503 and operation 509.

In operation 507, the electronic device 201 (for example, the processor 210) may determine whether the message display time (for example, the display time 460) arrives. For example, when the message received in operation 505 is a reserved message, the processor 210 may wait until the message display time without displaying the message. That is, the processor 210 may wait until the message display time without informing of message reception. For example, when the message display time is 13:00, the processor 210 may identify whether the current time is 13:00 or is close to 13:00 (for example, 12:59 or 12:59:30).

In operation 509, the electronic device 201 (for example, the processor 210) may make a request for identifying whether to display the message. The processor 220 may make a request for identifying whether to display the message to the message service server 400 before informing of the message reception. The processor 210 may transmit the request for identifying whether to display the message to the message service server 400 through the communication module 220. For example, the processor 210 may transmit the request for identifying whether to display the message containing a message identifier or a phone number of the electronic device 201 included in the message.

In operation 511, the message service server 400 (for example, the controller 410) may identify whether to cancel the message. For example, the controller 410 may receive the request for identifying whether to display the message through the communication unit 420 and identify, in the storage unit 430, cancellation information corresponding to the message identifier received from the electronic device 201. The controller 410 may determine a display control command on the basis of the cancellation information.

In operation 513, the message service server 400 (for example, the controller 410) may transmit the display control command. The display control command may control whether to display the message transmitted in operation 503 on the electronic device 201. For example, when the message is cancelled through the identification in the storage unit 430, the controller 410 may transmit a message cancellation command (or a message deletion command). Alternatively, when the message is not cancelled, the controller 410 may transmit a message display command.

In operation 517, the electronic device 201 (for example, the processor 210) may control whether to display the received message on the basis of the display control command. For example, when the message cancellation command is received through the communication module 220, the processor 210 may delete the message stored in the memory 230. When the message stored in the memory 230 is deleted, the user may not recognize whether the message has been received since the message has been deleted from the electronic device 201 internally. Alternatively, when the message display command is received through the communication module 220, the processor 210 may display the message stored in the memory 230 at the message display time. For example, the processor 210 may display the message stored in the memory 230 through the display 260. At this time, when displaying the message, the processor 210 may display the message in the form which is the same as or similar to that of the message reception notification. The user may recognize the message has been received through the message displayed on the display 260.

Figure 6:
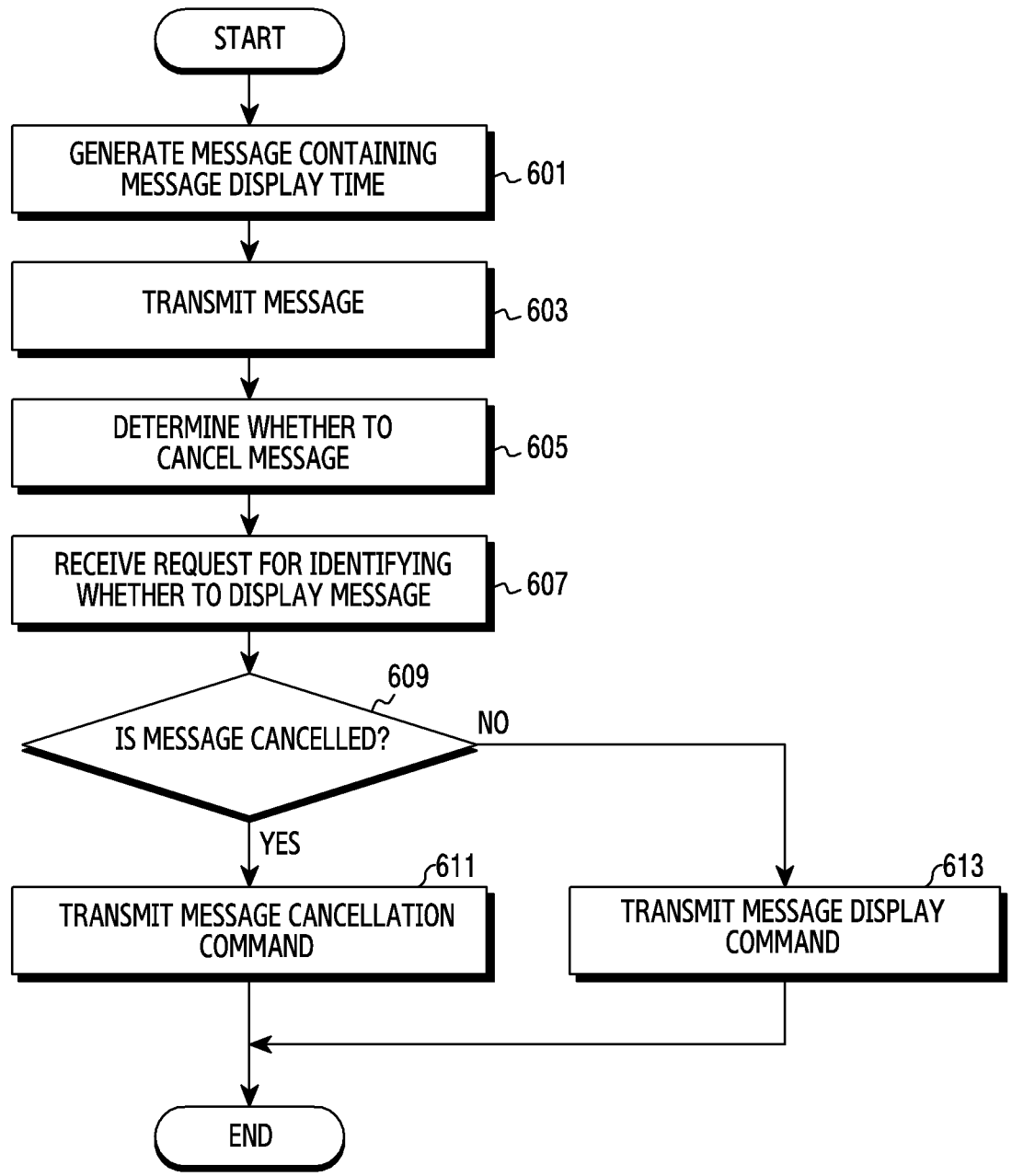
FIG. 6 is a flowchart illustrating an operation method of the message service server according to various embodiments.
Figure 7:
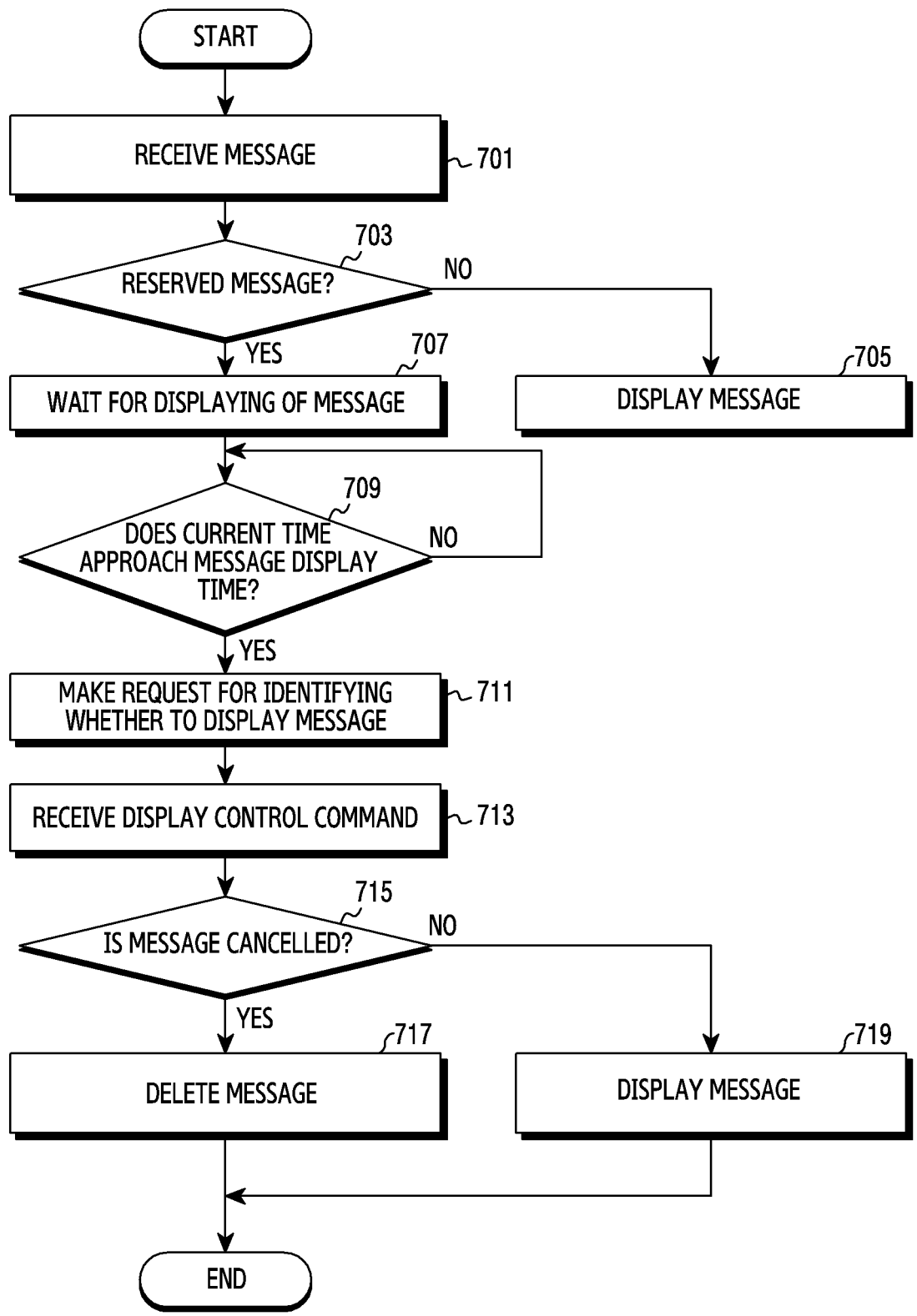
FIG. 7 is a flowchart illustrating an operation method of the electronic device according to various embodiments.

Hereinafter, FIGS. 6 and 7 illustrate detailed processes performed by subjects (for example, the message service server 400 and the electronic device 201) in the operation of FIG. 5.

FIG. 6 is a flowchart illustrating an operation method of the message service server according to various embodiments.

Referring to FIG. 6, in operation 601, the message service server 400 (for example, the controller 410) may generate a message containing a message display time. The controller 410 may generate message text, insert the message display time into the message, and determine a target to receive the message. The message display time may be the same as the message transmission time or may be later than the message transmission time. Further, the target to receive the message may be a phone number of the electronic device or may be configured as many unspecified targets corresponding to user information such as gender, region, or age.

In operation 603, the message service server 400 (for example, the controller 410) may transmit the message through the communication unit 420. The message may be transmitted to each electronic device through the message transmission system of the mobile carrier or the message transmission system using an Internet protocol. After transmitting the message, the controller 410 may store the message identifier related to the transmitted message or the target to receive the message in the storage unit 430.

In operation 605, the message service server 400 (for example, the controller 410) may determine whether to cancel the message. For example, when the message contains peculiar content, when the target to receive the message is wrongly configured, or when there is a request from a message sender, the controller 410 may determine to cancel the transmitted message. The controller 410 according to various embodiments may determine to cancel all the transmitted messages (for example, cancel all messages transmitted to all users) or cancel only messages transmitted to wrong targets to receive the messages (cancel only messages transmitted to some users). When it is determined to cancel the message, the controller 410 may store cancellation information corresponding to the message identifier stored in the storage unit 430 as "cancel". Alternatively, when it is determined not to cancel the message, the controller 410 may store cancellation information corresponding to the message identifier stored in the storage unit 430 as "do not cancel (or display)".

In operation 607, the message service server 400 (for example, the controller 410) may receive a request for identifying whether to display the message. The controller 410 may receive the request for identifying whether to display the transmitted message from the electronic device (for example, the electronic device 201) receiving the transmitted message through the communication unit 420.

In operation 609, the message service server 400 (for example, the controller 410) may determine whether the message is cancelled. For example, the controller 410 may identify cancellation information corresponding to the message identifier of the message in the storage unit 430. When the cancellation information is "cancel", the controller 410 may determine that the transmitted message has been cancelled. When the cancellation information is "do not cancel", the controller 410 may determine that the transmitted message has not been cancelled.

The controller 410 may perform operation 611 when the message is cancelled, and perform operation 613 when the message is not cancelled.

When the message is cancelled, the message service server 400 (for example, the controller 410) may transmit a message cancellation command in operation 611. For example, the controller 410 may transmit the message cancellation command to the electronic device 201 making the request for identifying whether to display the message. Upon receiving the message cancellation command, the electronic device 201 may delete the message internally without displaying the received message.

When the message is not cancelled, the message service server 400 (for example, the controller 410) may transmit a message display command in operation 613. For example, the controller 410 may transmit the message display command to the electronic device 201 making the request for identifying whether to display the message. Upon receiving the message display command, the electronic device 201 may display the message stored in the memory (for example, message reception notification).

FIG. 7 is a flowchart illustrating an operation method of the electronic device according to various embodiments.

Referring to FIG. 7, in operation 701, the electronic device 201 (for example, the processor 210) may receive a message through the communication module 220. The processor 210 may receive the message from the message service server 400 through the communication module 220.

In operation 703, the electronic device 201 (for example, the processor 210) may determine whether the received message is a reserved message. For example, the message may be displayed immediately after being received, may be displayed at a message display time, or may include content. The message displayed immediately after reception may be a normal-type message and the message displayed at the message display time may be a cancellation-type (or reservation-type) message. The processor 210 may classify the cancellation-type message as a reserved message. Alternatively, the message containing content may be the cancellation-type message and also be a content-type message. The content-type message will be described in detail with reference to FIGS. 9 to 12.

The processor 210 may perform operation 707 when the received message is a reserved message, and perform operation 705 when the received message is not a reserved message.

When the received message is not a reserved message, the electronic device 201 (for example, the processor 210) may display the received message in operation 705. Displaying the received message may be informing (or notifying) that the message has been received through the display 260. Alternatively, the processor 210 may notify that the message has been received through the audio module 280. For example, the processor 210 may output at least one of mute, vibration, or sound with respect to the message reception on the basis of audio notification configured in the electronic device 201. For example, the processor 210 may provide a user interface including some or all of the received message text and a sender transmitting the message. The processor 210 may control the user interface related to the message display on the basis of notification display configured in the electronic device 201. The user may recognize that the message has been received through the user interface displayed on the display 260 or the audio output.

When the received message is a reserved message, the electronic device 201 (for example, the processor 210) may wait for displaying of the message in operation 707. The processor 210 may temporarily store the received message in the memory 230. That is, the processor 210 may display the user interface related to the message reception or wait until the message display time without making the audio output.

In operation 709, the electronic device 201 (for example, the processor 210) may determine whether the current time approaches the message display time (for example, the display time 460). For example, the processor 210 may configure a timer corresponding to the message display time or count a time until the message display time. For example, when the message display time is 09:00, the processor 210 may determine whether the current time is 09:00 or the current time reaches a time close to 09:00 (for example, 08:59).

When the current time approaches the message display time, the electronic device 201 (for example, the processor 210) may make a request for identifying whether to display the received message in operation 711. For example, the processor 210 may transmit a request for identifying whether to display the received message including a message identifier or a phone number of the electronic device 201 to the message service server 400 transmitting the message through the communication module 220.

In operation 713, the electronic device 201 (for example, the processor 210) may receive a display control command from the message service server 400. The display control command may indicate whether to display or delete the received message.

In operation 715, the electronic device 201 (for example, the processor 210) may determine whether the received message has been cancelled on the basis of the display control command.

The processor 210 may perform operation 717 when the received message is cancelled and perform operation 719 when the received message is not cancelled.

When the received message is cancelled, the electronic device 201 (for example, the processor 210) may delete the received message in operation 717. For example, when the display control command is a "message cancellation command", the processor 210 may delete the message stored in the memory 230. Since the message stored in the memory 230 is a message before being displayed and the processor 210 deletes the message before the message is displayed on the display 260, the user may not know whether the message has been received. Accordingly, the received message may be deleted unknown to the user.

When the received message is not cancelled, the electronic device 201 (for example, the processor 210) may display the received message in operation 719. For example, when the display control command is a "message display command", the processor 210 may display the message stored in the memory 230 at the message display time. Displaying the message may be informing (or notifying) of reception of the message through the display 260. Alternatively, the processor 210 may output at least one of the mute, vibration, or sound with respect to reception of the message on the basis of audio notification configured in the electronic device 201. The form (for example, display or audio output) of the message reception notification displayed in operation 719 may be the same as or similar to the form of the message reception notification displayed in operation 705.

Figure 8:
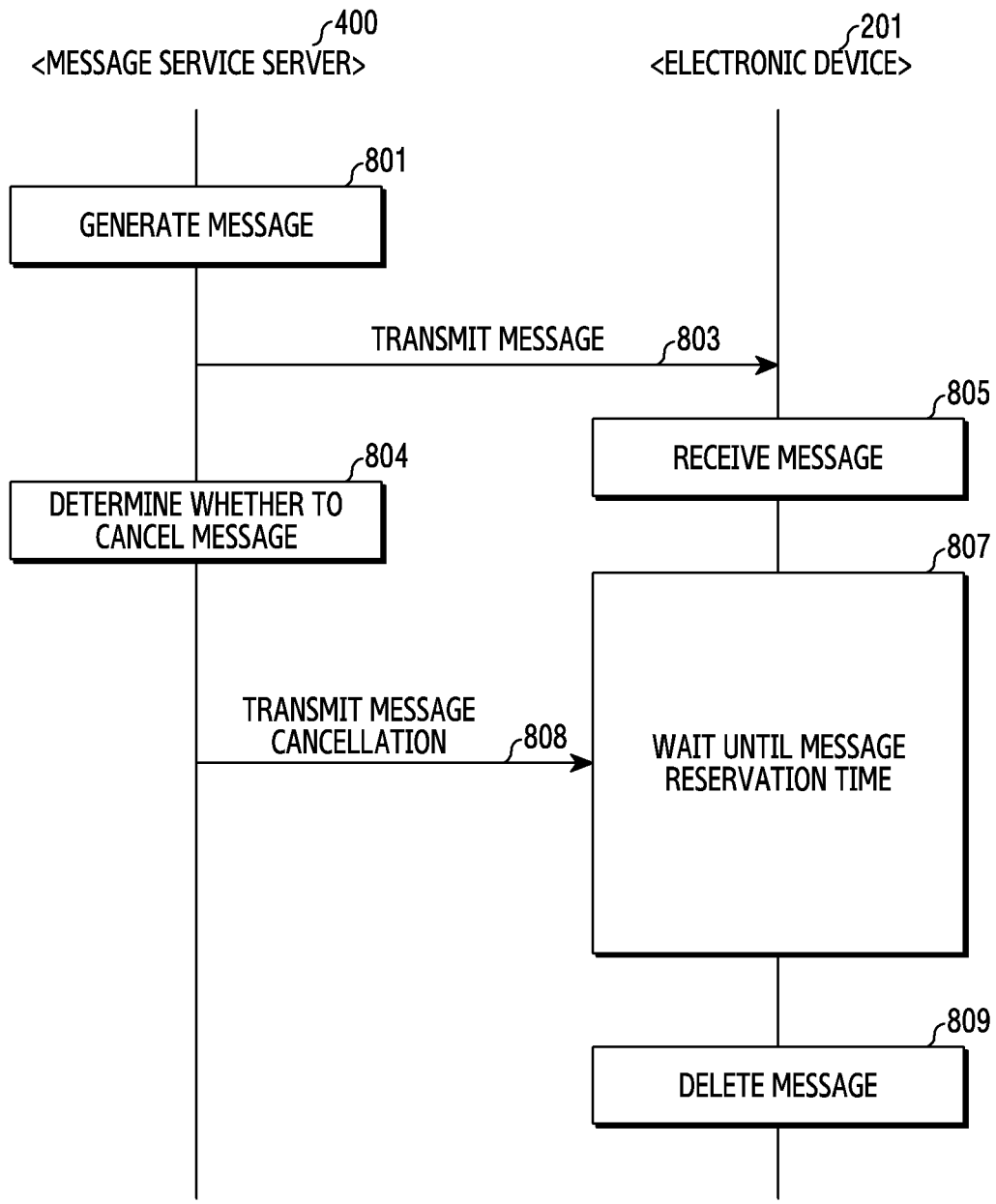
FIG. 8 is a flowchart illustrating a method of canceling a message between the message service server and the electronic device according to various embodiments.

FIG. 8 is a flowchart illustrating a method of canceling a message between the message service server and the electronic device according to various embodiments. For example, the flowchart of FIG. 8 illustrates an embodiment in which a cancellation message is transmitted again before a message reservation time.

Referring to FIG. 8, in operation 801, the message service server 400 (for example, the controller 410) may generate a message. For example, the controller 410 may generate a message containing message text and a message reservation time (for example, a message display time).

In operation 803, the message service server 400 (for example, the controller 410) may transmit the generated message. The controller 410 may transmit the message to the target to receive the message through the communication unit 420.

In operation 804, the message service server 400 (for example, the controller 410) may determine whether to cancel the message. After transmitting the message to the electronic device 201, the controller 410 may determine whether to cancel the transmitted message. Operation 804 may be performed anytime after operation 803.

In operation 808, the message service server 400 (for example, the controller 410) may transmit message cancellation. When message cancellation is determined in operation 804, the controller 410 may transmit a message cancellation command (for example, message cancellation) to the electronic device 201 to which the message was transmitted through the communication unit 420. Operation 808 may be performed anytime after operation 804.

In operation 805, the electronic device 201 (for example, the processor 210) may receive the message. The processor 210 may receive the message from the message service server 400 through the communication module 220. The processor 210 may identify whether the received message is a reserved message. For example, the processor 210 may identify whether the received message contains a message reservation time (for example, a message display time).

When the received message is a reserved message, the electronic device 201 (for example, the processor 210) may wait until the message reservation time in operation 807. For example, when the received message is a reserved message, the processor 210 may store the received message in the memory 230. Further, the processor 210 may wait until the message reservation time without displaying the received message. The processor 210 may detect whether a message cancellation command is received from the message service server 400 during while waiting until the message reservation time.

When the message cancellation command is received, the electronic device 201 (for example, the processor 210) may delete the message (for example, the reserved message) in operation 809. For example, the processor 210 may delete the message which has not been displayed until the message reservation time (for example, the message received in operation 805) from the memory 230. In this case, the message received in operation 805 may be deleted from the memory 230 without being displayed on the display 260.

Figure 9:
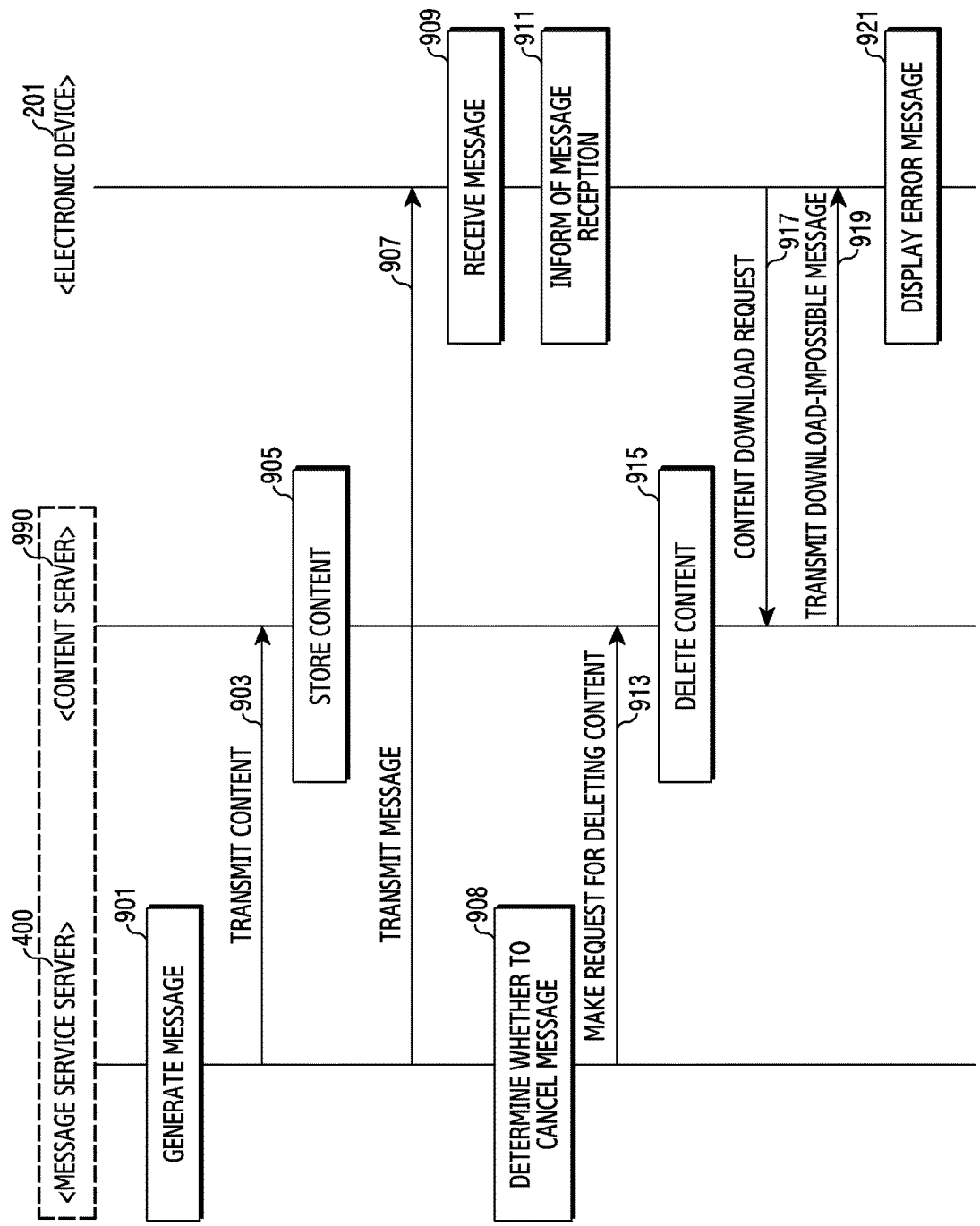
FIG. 9 is a flowchart illustrating a method of cancelling a message related to content between the message service server and the electronic device according to an embodiment.

FIG. 9 is a flowchart illustrating a method of cancelling a message related to content between the message service server and the electronic device according to an embodiment. The flowchart of FIG. 9 illustrates an embodiment of processing cancellation of a message when the message contains content. Further, FIG. 9 illustrates an example in which the message service server 400 and a content server 990 are separately implemented, but the content server 990 may be included in the message service server 400.

Referring to FIG. 9, in operation 901, the message service server 400 (for example, the controller 410) may generate a message. For example, the controller 410 may generate a message containing at least one of message text (for example, a message payload 450), a message display time (for example, the display time 460), or content information (for example, content information 470). Further, the controller 410 may determine a target to receive a message. With respect to data which is not included in the message payload 450, the controller 410 may generate the content information 470 containing address information from which data can be downloaded or location information in which data is stored and insert the content information 470 into the message. The controller 410 may generate a content identifier in accordance with a message identifier of the generated message and insert the content identifier into the content information 470.

In operation 903, the message service server 400 (for example, the controller 410) may transmit content to the content server 990. The content may correspond to content information contained in the generated message. At this time, the controller 410 may transmit content including the content identifier.

In operation 905, the content server 990 may store the content received from the message service server 400. The content server 900 may serve to provide the content to the electronic device (for example, the electronic device 201) or to store the content. To this end, the content server 990 may include a database for storing the content. The content server 990 may store content for each content identifier in the database. When the content server 990 according to various embodiments is implemented to be included in the message service server 400, the content server 990 may correspond to the storage unit 430.

In operation 907, the message service server 400 (for example, the controller 410) may transmit the generated message. The controller 410 may transmit the message to the target to receive the message (for example, the electronic device 201) through the communication unit 420. After transmitting the message, the controller 410 may store the message identifier related to the message, the content identifier, or the target to receive the message in the storage unit 430.

In operation 908, the message service server 400 (for example, the controller 410) may determine whether to cancel the message. After transmitting the message to the electronic device 201, the controller 410 may determine whether to cancel the transmitted message.

When it is determined to cancel the message, the message service server 400 (for example, the controller 410) may make a request for deleting the content to the content server 990 in operation 913. For example, the controller 410 may make a request for deleting the content transmitted in operation 903 to the content server 990. The controller 410 may transmit a request for deleting content containing the content identifier corresponding to the message identifier of the message which is determined to be cancelled to the content server 990.

In operation 915, the content server 990 may delete the content according to the deletion request received from the message service server 400. The content server 990 may search for the content identifier in the database and delete the content corresponding to the found content identifier.

Operation 908, operation 913, and operation 915 may be performed anytime after operation 907. For example, operation 908, operation 913, and operation 915 may be performed while the electronic device 201 performs operation 909 and operation 911.

In operation 909, the electronic device 201 (for example, the processor 210) may receive the message. The processor 210 may receive the message from the message service server 400 through the communication module 220.

In operation 911, the electronic device 201 (for example, the processor 210) may inform of message reception. For example, the processor 210 may inform of message reception through the display 260 or the audio module 280. For example, the processor 210 may identify whether the received message contains content information (for example, the content information 470). The message may contain both the message display time 460 and the content information 470 or only the content information 470. When the received message contains the content information 470, the processor 210 may notify of message reception.

When the received message contains both the message display time 460 and the content information 470, the processor 210 according to various embodiments may store the received message in the buffer (for example, the memory 230) and wait until the message display time without informing of message reception notification. In this case, the processor 210 may transmit a request for downloading content to the content server 990 at the message display time 460. That is, when the message display time 460 arrives, the processor 210 may transmit the request for downloading content to the content server 990 without any user request.

In operation 917, the electronic device 201 (for example, the processor 210) may make a request for downloading content to the content server 990. When a user input is received through a user input unit (for example, the input device 250), the processor 210 may transmit the request for downloading content to the content server 990. For example, the processor 210 may detect a user input for clicking a content download button included in the message of which reception is notified in operation 911. The processor 210 may make the request for content on the basis of content information contained in the message according to the detection of the user input. The request for downloading the content may include a content identifier contained in the content information or a message identifier contained in the message.

In operation 919, the content server 990 may transmit a download-impossible message in response to the content download request received from the electronic device 201. For example, the content server 990 may identify whether content corresponding to the content identifier contained in the content download request is stored in the database. When the content is not stored in the database, the content server 990 may transmit the download-impossible message. Alternatively, when the content is stored in the database, the content server 990 may transmit the stored content to the electronic device 201.

In operation 921, the electronic device 201 (for example, the processor 210) may display an error message by the download-impossible message. For example, when the download-impossible message is received, the processor 210 may display the error message. That is, since the processor 210 has not received the content from the content server 990, the processor 210 may display the error message (for example, "message has been deleted" or "content cannot be downloaded") through the display 260. The error message may be displayed in a popup form or may be an empty message containing nothing. Alternatively, when the processor 210 receives the content from the content server 990, the processor 210 may display the received content.

Figure 10:
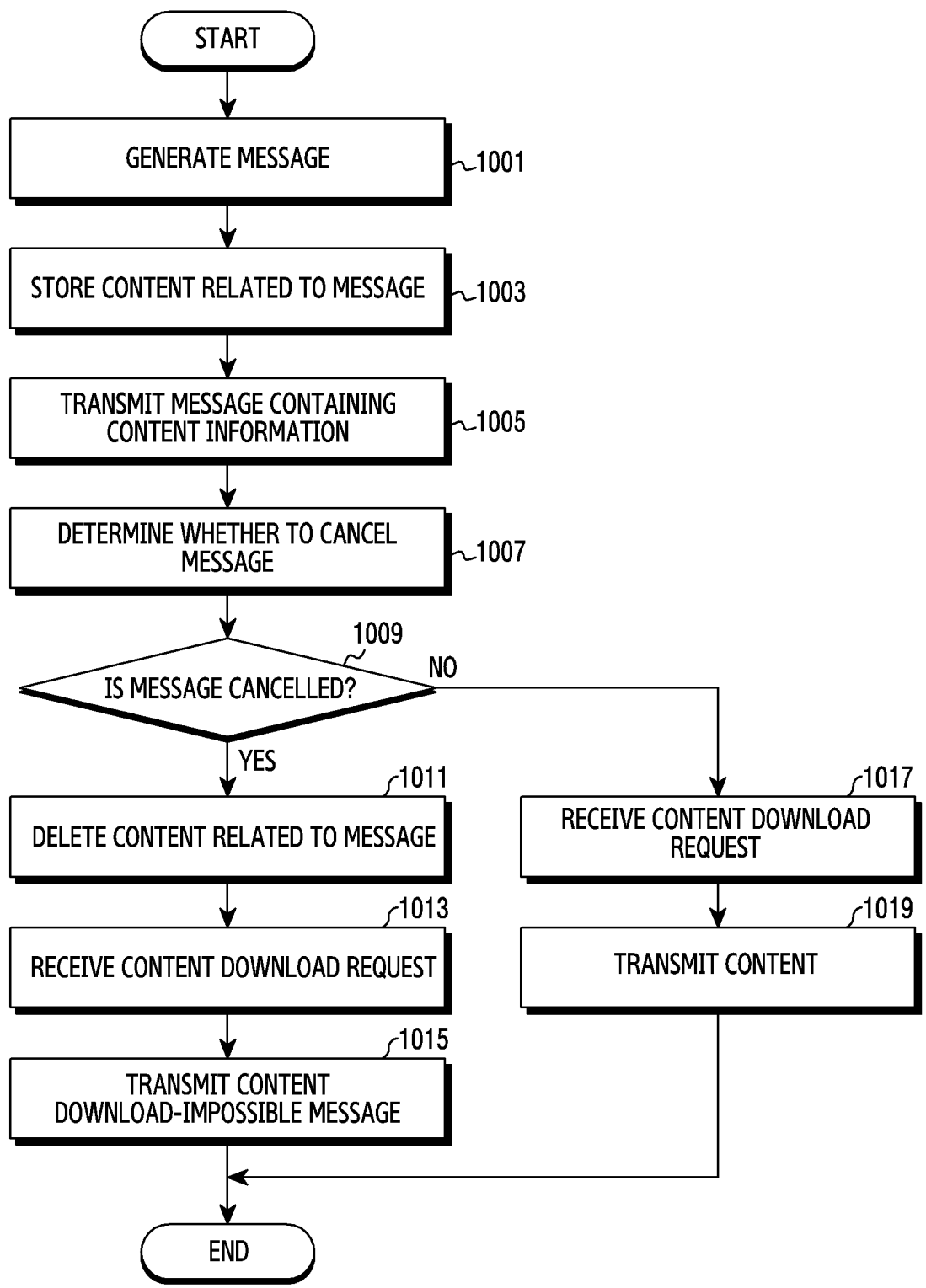
FIG. 10 is a flowchart illustrating a method of cancelling a message by the message service server according to another embodiment.

FIG. 10 is a flowchart illustrating a method of cancelling a message by the message service server according to another embodiment. In FIG. 10, an embodiment in which the content server 990 is included I the message service server 400 is illustrated.

In operation 1001, the message service server 400 (for example, the controller 410) may generate a message containing content information. The controller 410 may generate message text, insert content information into the message, and determine a target to receive the message. Alternatively, the controller 410 may further insert a message display time into the message.

In operation 1003, the message service server 400 (for example, the controller 410) may store content related to the message. For example, the controller 410 may store a content identifier corresponding to the content information and the content in the storage unit 430.

In operation 1005, the message service server 400 (for example, the controller 410) may transmit the message through the communication unit 420. After transmitting the message, the controller 410 may store a message identifier related to the transmitted message and the target to receive the message to be associated with the content identifier in the storage unit 430.

In operation 1007, the message service server 400 (for example, the controller 410) may determine whether to cancel the message. For example, when the message contains peculiar content, when the target to receive the message is wrongly configured, or when there is a request from a message sender, the controller 410 may determine to cancel the transmitted message.

In operation 1009, the message service server 400 (for example, the controller 410) may determine whether it is determined to cancel the message.

The controller 410 may perform operation 1011 when the message is cancelled and perform operation 1017 when the message is not cancelled.

When the message is cancelled, the message service server 400 (for example, the controller 410) may delete content related to the message from the storage unit 430 in operation 1011. For example, the controller 410 may search for the content identifier corresponding to the message identifier of the message determined to be cancelled (for example, the message transmitted in operation 1005) and delete the content related to the content identifier from the storage unit 430. Further, the controller 410 may store cancellation information corresponding to the message identifier of the message determined to be cancelled in the storage unit 430 as "cancel".

In operation 1013, the message service server 400 (for example, the controller 410) may receive a content download request from the electronic device (for example, the electronic device 201). The controller 410 according to various embodiments may receive the content download request at a message display time or by a request from the user of the electronic device 201. The content download request may contain a content identifier or a message identifier.

In operation 1015, the message service server 400 (for example, the controller 410) may transmit a content download-impossible message to the electronic device 201. For example, the controller 410 may search for content corresponding to the content identifier contained in the content download request in the storage unit 430 and, when no content is found, transmit the content download-impossible message. Alternatively, when cancellation information corresponding to the message identifier contained in the content download request is stored in the storage unit 430 "as cancel", the controller 410 may transmit the content download-impossible message.

When the message is not cancelled, the message service server 400 (for example, the controller 410) may wait until the content downlink request is received. In operation 1017, the message service server 400 (for example, the controller 410) may receive a content download request from the electronic device (for example, the electronic device 201).

In operation 1019, the message service server 400 (for example, the controller 410) may transmit content to the electronic device 201. For example, the controller 410 may search for content corresponding to the content identifier contained in the content download request and, when the content is found, transmit the found content.

Figure 11:
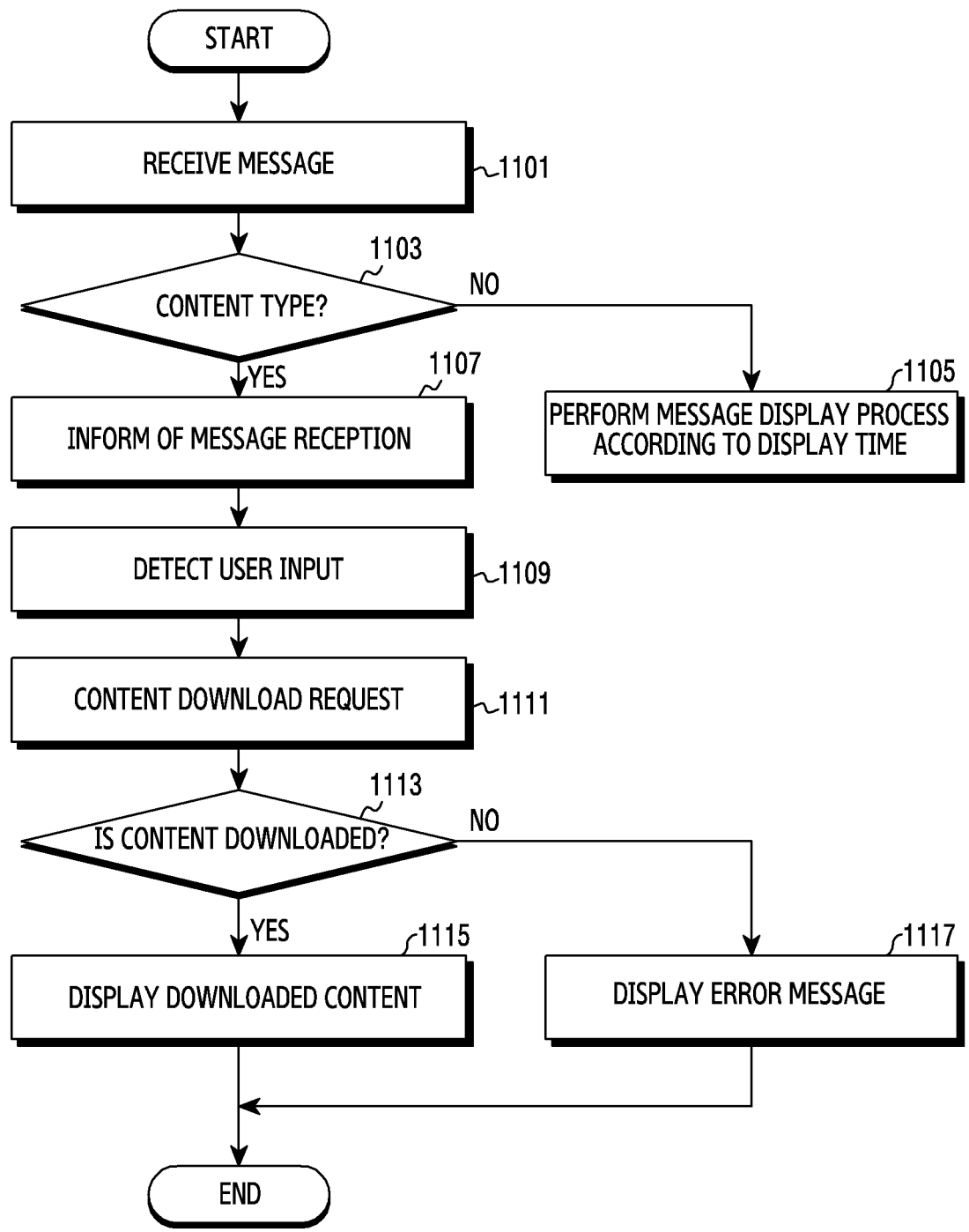
FIG. 11 is a flowchart illustrating a method of cancelling a message by the electronic device according to another embodiment.

FIG. 11 is a flowchart illustrating a method of cancelling a message by the electronic device according to another embodiment.

Referring to FIG. 11, in operation 1101, the electronic device 201 (for example, the processor 210) may receive a message through the communication module 220. Since operation 1101 is the same as or similar to operation 701, a detailed description thereof will be omitted.

In operation 1103, the electronic device 201 (for example, the processor 210) may determine whether the received message is a content type. For example, the message may be displayed immediately after being received, may be displayed at a message display time, or may include content. The message displayed immediately after reception may be a normal-type message and the message displayed at the message display time may be a cancellation-type (or reservation-type) message. The message containing content may be the cancellation-type message and also be the content-type message. When the message contains content, the processor 210 may classify the message as the content-type message.

The processor 210 may perform operation 1107 when the message is the content type and perform operation 1105 when the message is not the content type.

When the message is not the content type, the electronic device 201 (for example, the processor 210) may perform a message display process according to a display time in operation 1105. The message display process according to the display time may correspond to operation 703 to operation 719 of FIG. 7.

When the message is the content type, the electronic device 201 (for example the processor 210) may provide a message reception notification in operation 1107. For example, the processor 210 may inform of message reception through the display 260 or the audio module 280. The message may contain both the message display time (for example, the display time 460) and content information (for example, the content information 470) or only the content information 470. When the received message contains the content information 470, the processor 210 may notify of message reception. An embodiment in which the received message contains both the message display time 460 and the content information 470 will be described in detail with reference to FIG. 12.

In operation 1109, the electronic device 201 (for example, the processor 210) may detect a user input. For example, the user may select a content download button contained in the message through the message of which reception is notified. When the user input is detected from the message of which reception is notified, the processor 210 may determine that a request for downloading content is made by the user.

In operation 1111, the electronic device 201 (for example, the processor 210) may make a request for downloading content to the message service server 400. The processor 210 may make the request for content on the basis of content information contained in the message according to the detection of the user input. The request for downloading the content may include a content identifier contained in the content information or a message identifier contained in the message.

In operation 1113, the electronic device 201 (for example, the processor 210) may determine whether the content is downloaded on the basis of the message type received from the message service server 400.

The processor 210 may perform operation 1115 when the content is downloaded, and may perform operation 1117 when the content is not downloaded.

When the content is downloaded, the electronic device 201 (for example, the processor 210) may display the downloaded content in operation 1115. When the content is downloaded through the communication module 220, the processor 210 may provide the downloaded content through the display 260 or the audio module 280.

When the content is not downloaded, the electronic device 201 (for example, the processor 210) may display an error message in operation 1117. When a download-impossible message is received through the communication module 220, the processor 210 may provide the error message through the display 260 or the audio module 280. That is, since the processor 210 has not received the content from the content server 990, the processor 210 may display the error message (for example, "message has been deleted" or "content cannot be downloaded") through the display 260. The error message may be displayed in a popup form or may be an empty message containing nothing.

Figure 12:
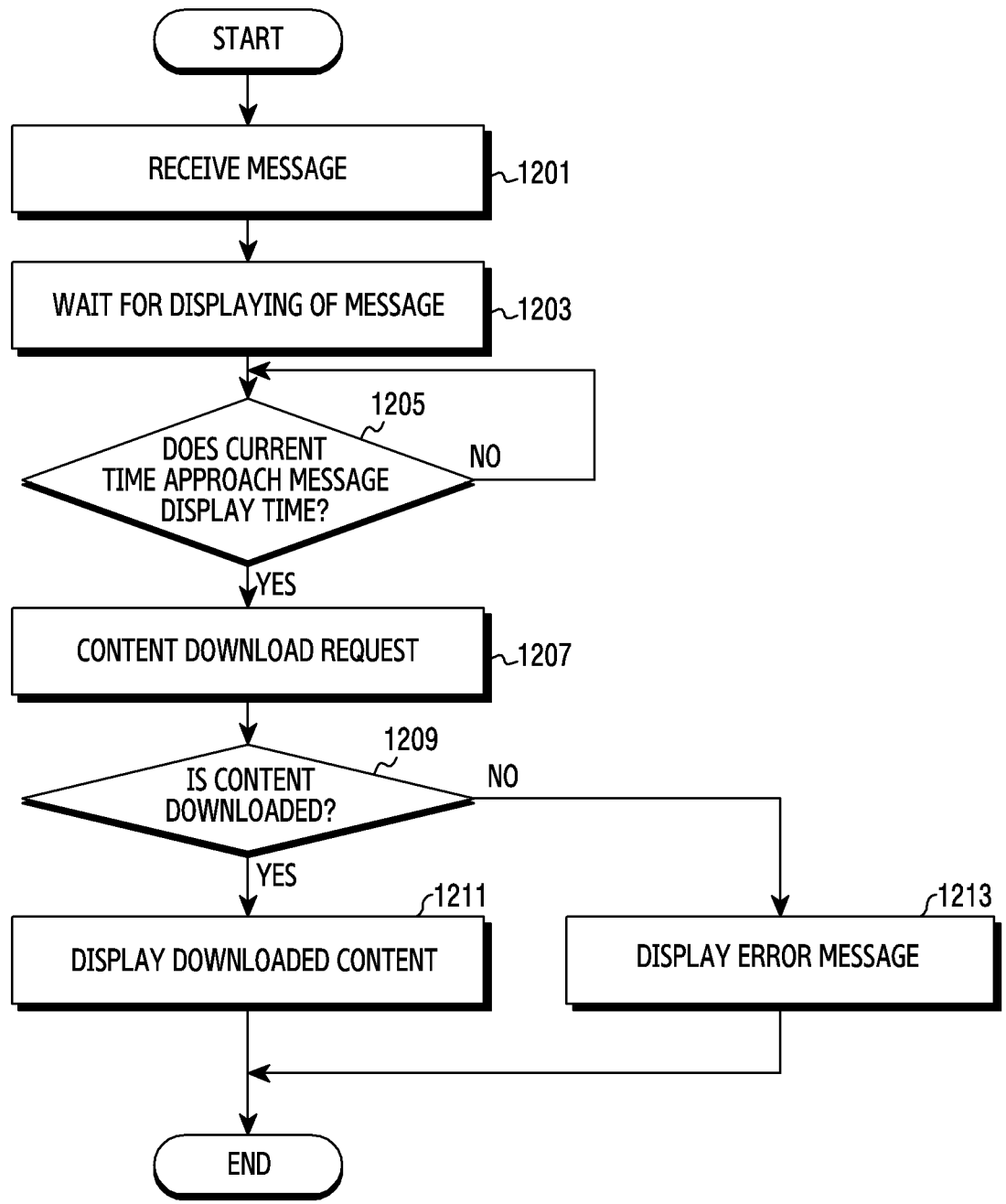
FIG. 12 is a flowchart illustrating a method of cancelling a message by the electronic device according to another embodiment.

FIG. 12 is a flowchart illustrating a method of cancelling a message by the electronic device according to another embodiment. The flowchart of FIG. 12 illustrates an embodiment in which the received message contains both the message display time and content information.

Referring to FIG. 12, in operation 1101, the electronic device 201 (for example, the processor 210) may receive a message through the communication module 220. Since operation 1201 is the same as or similar to operation 701 or operation 1101, a detailed description thereof will be omitted.

The processor 210 according to various embodiments may determine whether the received message is a reserved message and, when the received message is a reserved message, display the received message. When the received message is a reserved message, the processor 210 may wait for displaying of the message. That is, although not illustrated in FIG. 12, the processor 210 may perform operation 703 or operation 705 of FIG. 7 between operation 1201 and operation 1203.

In operation 1203, the electronic device 201 (for example, the processor 210) may wait for displaying of the message. The processor 210 may temporarily store the received message in the memory 230. That is, the processor 210 may display the user interface related to the message reception or wait until the message display time without making the audio output.

In operation 1205, the electronic device 201 (for example, the processor 210) may determine whether the message display time (for example, the display time 460) arrives. For example, the processor 210 may configure a timer corresponding to the message display time or count a time until the message display time. Since operation 1205 is the same as or similar to operation 709 of FIG. 7, a detailed description thereof will be omitted.

When the message display time almost arrives, the electronic device 201 (for example, the processor 210) may make a request for downloading content in operation 1207. For example, when the message display time arrives without a separate request from the user, the processor 210 may make a request for downloading content to the message service server 400 through the communication module 220.

In operation 1209, the electronic device 201 (for example, the processor 210) may determine whether the content is downloaded on the basis of the message type received from the message service server 400.

The processor 210 may perform operation 1211 when the content is downloaded, and may perform operation 1213 when the content is not downloaded.

When the content is downloaded, the electronic device 201 (for example, the processor 210) may display the downloaded content in operation 1211. Since operation 1211 is the same as or similar to operation 1115, a detailed description thereof will be omitted.

When the content is not downloaded, the electronic device 201 (for example, the processor 210) may display an error message in operation 1213. When a download-impossible message is received through the communication module 220, the processor 210 may provide the error message through the display 260 or the audio module 280. Since operation 1213 is the same as or similar to operation 1117, a detailed description thereof will be omitted.

A method of operating an electronic device according to various embodiments includes an operation of determining whether a received message contains a message display time, an operation of, when the received message contains the message display time, determining whether a current time approaches the message display time, an operation of, when the current time approaches the message display time, making a request for identifying whether to display the received message to a message service server, and an operation of determining whether to display the message on the basis of a display control command received from the message service server by the request.

The method may further include when the received message contains the message display time, an operation of storing the received message in a memory of the electronic device and an operation of waiting for displaying of the message until the message display time.

The method may further include an operation of, when a message cancellation command is received from the message service server by the request for identifying whether to display the message, deleting the received message stored in the memory, and an operation of, when a message display command is received from the message service server by the request for identifying whether to display the message, displaying the message stored in the memory at the message display time.

The method may further include an operation of, when a cancellation command is received from the message service server before the current time approaches the message display time, deleting the message stored in the memory.

The method may further include an operation of, when the message contains content information, informing of reception of the message and an operation of, when a user input for a content download request is detected from a user through the message, making a request for downloading content to the message service server.

The method may further include an operation of, when content is received from the message service server by the content download request, displaying the received content and an operation of, when a content download-impossible command is received from the message service server by the content download request, displaying an error message.

The method may further include an operation of, when the message contains the message display time and content information and the current time approaches the message display time, transmitting a content download request to the message service server.

A computer-readable recording medium according to various embodiments may include a program for executing an operation of determining whether a received message contains a message display time, an operation of, when the received message contains the message display time, determining whether a current time approaches the message display time, an operation of, when the current time approaches the message display time, making a request for identifying whether to display the received message to a message service server, and an operation of determining whether to display the message on the basis of a display control command received from the message service server by the request.

The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. An electronic device comprising:
a memory;
communication circuitry;
a display; and
a processor connected to the memory, the communication circuitry, or the display,
wherein the processor is configured to:
receive, from a first server, through the communication circuitry, a push message including message content and a field,
identify a type of the push message based on the field, wherein the type is one of a general type, a reserved type or a content type,
wherein the push message of the general type comprises no message display time in the field,
wherein the push message of the reserved type comprises information on a message display time in the field, and
wherein the push message of the content type comprises content information for downloading additional content and the information on the message display time in the field,
if the type of the push message is the general type,
display the message content of the push message on the display,
if the type of the push message is the reserved type:
store the push message in the memory,
when a current time approaches the message display time, transmit, through the communication circuitry, a request to confirm whether to display the stored push message on the display to the first server,
receive a display control command in response to the request from the first server, and
display the message content of the stored push message on the display at the message display time based on the display control command, and if the type of the push message is the content type:
store the push message in the memory,
when the current time approaches the message display time, transmit, through the communication circuitry, a content download request to a second server based on the content information,
receive the additional content in response to the content download request, and
display, via the display, the message content of the stored push message and the received additional content at the message display time.

2. The electronic device of claim 1, wherein the processor is configured to:
display the message content based on the display control command indicating display, or
delete the push message in the memory based on the display control command indicating not to display.

3. The electronic device of claim 1, wherein, if the type of the push message is the content type, the processor is configured to:
display a user interface informing receipt of the push message; and
transmit the content download request to the second server in response to a user input for the user interface.

4. The electronic device of claim 3, wherein the processor is further configured to:
when a content download-impossible command is received from the second server in response to the content download request, display an error message on the display.

5. The electronic device of claim 1, wherein the content information includes address information for downloading the additional content or location information where the additional content is stored, and the second server is identified based on the content information.

6. A method of operating an electronic device, the method comprising:
receiving, from a first server, a push message including message content and a field;
identifying a type of the push message based on the field, wherein the type is one of a general type, a reserved type or a content type,
wherein the push message of the general type comprises no message display time in the field,
wherein the push message of the reserved type comprises information on a message display time in the field, and wherein the push message of the content type comprises content information for downloading additional content and the information on the message display time in the field;
if the type of the push message is the general type,
  displaying the message content of the push message on a display of the electronic device,
if the type of the push message is the reserved type:
  storing the push message in a memory of the electronic device,
  when a current time approaches the message display time, transmitting, to the first server, a request to confirm whether to display the stored push message on the display, and
  receiving, from the first server, a display control command in response to the request, and
  displaying the message content of the stored push message at the message display time on the display based on the display control command; and
if the type of the push message is the content type:
  store the push message in the memory,
  when the current time approaches the message display time, transmitting, through communication circuitry, a content download request to a second server based on the content information,
  receiving the additional content in response to the content download request, and
  displaying, via the display, the message content of the stored push message and the received additional content at the message display time.

7. The method of claim 6, further comprising:
if the type of the push message is the content type, displaying a user interface informing receipt of the message; and
transmitting a content download request to the second server in response to a user input for the user interface.

8. The method of claim 7, further comprising:
when a content download-impossible command is received from the second server in response to the content download request, displaying an error message.

9. The method of claim 6, further comprising:
displaying the message content of the push message based on the display control command indicating display, or deleting the push message in the memory based on the display control command indicating not to display.

10. The method of claim 6, wherein the content information includes address information for downloading the additional content or location information where the additional content is stored, and the second server is identified based on the content information.

* * * * *